United States Patent
Biasini et al.

(10) Patent No.: US 12,552,717 B2
(45) Date of Patent: Feb. 17, 2026

(54) LITHOGRAPHY-BASED PROCESS FOR THE PRODUCTION OF TRANSPARENT CERAMIC BODIES WITH AT LEAST TWO ZONES OF DIFFERENT COMPOSITION AND TRANSPARENT CERAMIC BODIES THUS OBTAINED

(71) Applicant: CONSIGLIO NAZIONALE DELLE RICERCHE, Rome (IT)

(72) Inventors: Valentina Biasini, Cesena (IT); Jan Hostaša, Faenza (IT); Laura Esposito, Faenza (IT); Andreana Piancastelli, Faenza (IT); Guido Toci, Florence (IT); Martin Schwentenwein, Zemendorf (AT); Dominik Philipp Brouczek, Schwechat (AT)

(73) Assignee: CONSIGLIO NAZIONALE DELLE RICERCHE, Rome (IT)

( * ) Notice: Subject to any disclaimer, the term of this patent is extended or adjusted under 35 U.S.C. 154(b) by 720 days.

(21) Appl. No.: 17/906,521

(22) PCT Filed: Mar. 22, 2021

(86) PCT No.: PCT/EP2021/057169
§ 371 (c)(1),
(2) Date: Sep. 16, 2022

(87) PCT Pub. No.: WO2021/186076
PCT Pub. Date: Sep. 23, 2021

(65) Prior Publication Data
US 2023/0138537 A1     May 4, 2023

(30) Foreign Application Priority Data

Mar. 20, 2020 (IT) .......................... 102020000005998

(51) Int. Cl.
*B33Y 10/00*     (2015.01)
*B28B 1/00*     (2006.01)
(Continued)

(52) U.S. Cl.
CPC ............ *C04B 35/505* (2013.01); *B28B 1/001* (2013.01); *B28B 11/243* (2013.01); *B33Y 10/00* (2014.12);
(Continued)

(58) Field of Classification Search
None
See application file for complete search history.

(56) References Cited

U.S. PATENT DOCUMENTS 5,441,803 A     8/1995     Meissner

FOREIGN PATENT DOCUMENTS

| CN | 107129293 A | 9/2017 |
| CN | 107200575 A | 9/2017 |

(Continued)

OTHER PUBLICATIONS

Hostasa, Jan et al. : "Transparent layered YAG ceramics with structured Yb doping produced via tape casting", Optical Materials, vol. 65, Sep. 29, 2016 (Sep. 29, 2016), pp. 21-27 (Year: 2016).*

(Continued)

*Primary Examiner* — Mohammad M Ameen
(74) *Attorney, Agent, or Firm* — Leason Ellis LLP

(57) ABSTRACT

It is described a process for producing transparent ceramic bodies with at least two zones having different garnet composition, in particular in which one of said zones has composition $Y_3Al_5O_{12}$. The invention is especially useful for the production of transparent ceramic bodies having preset complex shapes and/or a controlled complex distribution of doping ions.

12 Claims, 3 Drawing Sheets

(51) Int. Cl.
| | |
|---|---|
| *B28B 11/24* | (2006.01) |
| *B33Y 40/20* | (2020.01) |
| *B33Y 70/00* | (2020.01) |
| *C04B 35/505* | (2006.01) |
| *C04B 35/626* | (2006.01) |
| *C04B 35/634* | (2006.01) |
| *C04B 35/638* | (2006.01) |
| *C04B 35/645* | (2006.01) |

(52) U.S. Cl.
CPC .............. *B33Y 40/20* (2020.01); *B33Y 70/00* (2014.12); *C04B 35/6264* (2013.01); *C04B 35/6269* (2013.01); *C04B 35/63456* (2013.01); *C04B 35/638* (2013.01); *C04B 35/6455* (2013.01); *C04B 2235/3222* (2013.01); *C04B 2235/3225* (2013.01); *C04B 2235/549* (2013.01); *C04B 2235/6026* (2013.01); *C04B 2235/6567* (2013.01); *C04B 2235/6581* (2013.01); *C04B 2235/663* (2013.01); *C04B 2235/664* (2013.01); *C04B 2235/9653* (2013.01)

(56) References Cited

FOREIGN PATENT DOCUMENTS

| | | | |
|---|---|---|---|
| CN | 108 530 070 A | * | 9/2018 |
| CN | 109761608 A | | 5/2019 |
| WO | 2009038674 A2 | | 3/2009 |
| WO | 2017218895 A1 | | 12/2017 |

OTHER PUBLICATIONS

Jan Hostasa et al. : "Transparent layered YAG ceramics with structured Yb doping produced via tape casting", Optical Material 65 (2017) p. 21-27 (Year: 2017).*

Song Hu et al.: "3D printed ceramic phosphor and the photoluminescence property under blue laser excitation", Journal of the European Ceramic Society, 39 (2019) p. 2731-2738 (Year: 2019).*

Appiagyei et al. "Aqueous slip casting of transparent yttrium aluminum garnet (YAG) ceramics." Ceramics International 34.5 (2008): 1309-1313.

Dosovitskiy et al. "First 3D-printed complex inorganic polycrystalline scintillator." CrystEngComm 19.30 (2017): 4260-4264.

Hostasa et al. "Preparation and characterization of Yb-doped YAG ceramics." Optical Materials 35.4 (2013): 798-803.

Hostasa et al. "Transparent layered YAG ceramics with structured Yb doping produced via tape casting." Optical Materials 65 (2017): 21-27.

Hu et al. "3D printed ceramic phosphor and the photoluminescence property under blue laser excitation." Journal of the European Ceramic Society 39.8 (2019): 2731-2738.

Ikesue et al. "Composite laser ceramics by advanced bonding technology." Materials 11.2 (2018): 271.

Ikesue et al. "Fabrication and optical properties of high-performance polycrystalline Nd: YAG ceramics for solid-state lasers." Journal of the American Ceramic Society 78.4 (1995): 1033-1040.

International Search Report and Written Opinion for corresponding International Patent Application No. PCT/EP2021/057169 dated Jun. 25, 2021. 18 pages.

Jiang et al. "Fabrication and kW-level MOPA laser output of planar waveguide YAG/Yb: YAG/YAG ceramic slab." Journal of the American Ceramic Society 102.4 (2019): 1758-1767.

Lee et al. "Hot isostatic pressing of transparent Nd: YAG ceramics." Journal of the American Ceramic Society 92.7 (2009): 1456-1463.

Li et al. "Co-precipitation synthesis route to yttrium aluminum garnet (YAG) transparent ceramics." Journal of the European Ceramic Society 32.11 (2012): 2971-2979.

Yu et al. "Fabrication, microstructure and optical properties of large-sized Nd: YAG and composite Yb: YAG transparent ceramic slabs." Ceramics International 45.15 (2019): 19340-19344.

* cited by examiner

LITHOGRAPHY-BASED PROCESS FOR THE PRODUCTION OF TRANSPARENT CERAMIC BODIES WITH AT LEAST TWO ZONES OF DIFFERENT COMPOSITION AND TRANSPARENT CERAMIC BODIES THUS OBTAINED

CROSS-REFERENCE TO RELATED PATENT APPLICATIONS

This application is a U.S. National Stage Application under 35 U.S.C. § 371 of International Patent Application No. PCT/EP2021/057169 filed Mar. 22, 2021, which claims the benefit of priority of Italian Patent Application No. IT 102020000005998 filed Mar. 20, 2020, both of which are incorporated by reference in their entireties. The International Application was published on Sep. 23, 2021, as International Publication No. WO 2021/186076 A1.

FIELD OF THE INVENTION

The present invention relates to a process for the production of ceramic-based transparent materials with a variable 3-dimensional (3D) composition and complex shapes; the invention also relates to doped transparent ceramics, which find use in laser gain media, scintillators and lighting.

STATE OF THE ART

Materials requiring transparency for their use, in particular but not limited to applications in the optical field, have traditionally been based on glasses or single crystals. The former may be easily shaped and can be produced in large dimensions, but their thermal and thermomechanical properties are not sufficient for high performances. Single crystals, while having favorable properties, have limitations in shape and size and mostly require post-processing with significant amounts of scrap. Moreover, some materials or compositions, e.g. with high dopant concentrations, cannot be produced by the melt-growth methods used to produce single crystals.

Transparent ceramics offer the advantage of a variety of shaping techniques and possibilities, while maintaining the good performances of single crystals. These materials can be more cost effective in comparison to their single crystal counterparts, as they do not require slow solidification from the melt needed to provide large transparent boules that have to be cut into the desired shapes. In addition, the ceramic technology requires lower process temperatures compared to conventional crystal growth methods.

The applications of transparent ceramics cover solid-state laser gain media, scintillators, phosphors, lighting, armor and protective windows and domes.

Among functional transparent ceramics, the most important and most commonly used ones are the so-called garnets, compounds of general formula $A_3B_5O_x$, in which A and B are different metals, or A and/or B represent mixtures of metals. The most widely used garnet is $Y_3Al_5O_{12}$, generally referred to in the field as yttrium aluminum garnet or with its abbreviation YAG. Due to the technological relevance of YAG, in the rest of the description reference is mostly made to this material, but the invention is of general applicability to any transparent ceramic garnet.

YAG may be doped with specific transition metal ions or rare earth ions in order to modulate and fine-tune its properties in view of the intended application.

The paper "Fabrication and optical properties of high-performance polycrystalline Nd:YAG ceramics for solid-state lasers", A. Ikesue et al., Journal of the American Ceramic Society 78 (1995) 1033-1040, describes the fabrication of transparent ceramic neodymium doped YAG with quality high enough to allow laser oscillation. In the fabrication process of this paper, a mixture of oxide powders is used as starting material.

Another approach to the production of doped YAG is presented in the paper "Co-precipitation synthesis route to yttrium aluminum garnet (YAG) transparent ceramics", J. Li, et al., Journal of the European Ceramic Society, 32 (2012) 2971-2979. In this method, YAG powders are prepared by precipitation, and then densified to transparent YAG ceramic generally by vacuum sintering.

Sintering additives are preferably used to help with the removal of porosity. Sometimes, vacuum sintering is coupled with hot isostatic pressing, as reported for example in the paper "Hot isostatic pressing of transparent Nd:YAG ceramics", S-H. Lee et al., Journal of the American Ceramic Society, 92 (2009) 1456-1463.

In the case of uniform dopant distribution and simple shapes of the produced part, shaping methods like pressing ("Preparation and characterization of Yb-doped YAG ceramics", J. Hostaša et al., Optical Materials, 2013, 35, 798-803), tape casting (paper by Lee et al. cited above) or slip casting ("Aqueous slip casting of transparent yttrium aluminum garnet (YAG) ceramics", K. A. Appiagyei et al., Ceramics International, 2008, 34, 1309-1313) have been successfully tested with good results for the fabrication of transparent YAG ceramics.

However, with the recent development of optics and photonic technologies, further to the traditional uniformly doped YAG-based components, composite structures are required, e.g., with edge cladding or waveguides, where the functional variation of dopant concentration is used for light guiding or thermal management.

In some cases, such structures may be prepared using diffusion bonding to join carefully cut and polished single crystal optical components (technique disclosed in U.S. Pat. No. 5,441,803); this technique however is laborious, requiring the previous preparation of the crystals to be joined, and does not allow the production of optical parts with composition varying in the range of micrometers.

In alternative, structures with varying dopant profile are more readily produced by the advanced ceramic technology, where the material structure is shaped at the green body stage before the full densification and no further bonding is required after the sintering process.

Various techniques are available to this end.

A first possible technique is tape casting. In this well-known technique, a slurry consisting of powders of the desired inorganic material, a solvent and a binder (and possibly further components, for instance sintering aids) is deposited on a support; the solvent is then allowed to evaporate, obtaining a consolidated tape of binder embedding the inorganic powders. This tape has sufficient mechanical resistance to be detached from the support and handled. Parts of tapes prepared with different compositions can be stacked, pressed, and subjected to thermal treatments to eliminate the organic components and consolidate the layers of different inorganic powders. Examples of application of this technique to the production of ceramic bodies with a varying dopant concentration are provided e.g. in the papers "Transparent layered YAG ceramics with structured Yb doping produced via tape casting", J. Hostaša et al., Optical Materials 65 (2017) 21-27 and "Fabrication, microstructure and optical properties of large-sized Nd:YAG and composite Yb:YAG transparent ceramic slabs", S. Yu et al., Ceramics International 45 (2019) 19340-19344.

Possible variants of the tape casting technique are "co-casting", described for instance in patent application WO 2009/038674 A2, in which slurries of different compositions are deposited in parallel on the support; and the co-sintering of ceramic green bodies, described for instance in the paper "Composite laser ceramics by advanced bonding technology", A. Ikesue et al., Materials 11 (2018) 271.

These ceramic shaping processes allow the introduction of layered and gradient-like doping distribution. However, these methods in part suffer from a poor precision of the compositional and structural features; besides, the mentioned shaping techniques still limit the shaping possibilities to rather simple structures and for instance even the production of radially-graded bodies is extremely difficult.

Another possible approach to the production of transparent ceramic bodies is based on 3D printing (also referred to as additive manufacturing) of slurries of ceramic powders. This approach is followed for instance in the paper "First 3D-printed complex inorganic polycrystalline scintillator", G. A. Dosovitskiy et al., CrystEngComm vol. 19, 30 (2017) 4260-4264, in the paper "3D printed ceramic phosphor and the photoluminescence property under blue laser excitation", S. Hu et al., Journal of the European Ceramic Society, vol. 39, 8 (2019) 2731-2738, and in patent application CN 108530070 A. In these documents, 3D printing is used to produce bodies of doped ceramics with a uniform composition, namely, with no variation of the distribution of the dopants in any direction within the body.

In patent application WO 2017/218895 A1, 3D printing is used to produce YAG-based transparent ceramics for the fabrication of laser gain media. The method described in this document uses synthesized YAG powders and is tested to produce components with a doped/undoped 1-dimensional profile.

Finally, patent application CN 109761608 A describes a 3D printing method to produce composite (doped) transparent cylindrical ceramic bodies with a two-dimensional concentration gradient distribution of the doping ion concentration in the radial direction of the body. The method comprises preparing two slurries of ceramic powders of different compositions (for instance, a rare earth-doped ceramic slurry and an undoped ceramic slurry) and loading these in two separate reservoirs; connecting the two reservoirs to pressure controllers and to nozzles disposed in the cavity of a direct writing rapid prototyping machine; with the use of computer-aided software, adjusting the pressure in the two reservoirs to control the ratio of the two different slurries entering the nozzle cavity and, through layer-by-layer stacking, printing and molding the different slurries in the radial direction to obtain rod-shaped intermediate body; subjecting this intermediate body to cold isostatic pressing at a pressure in the range 100-200 MPa (holding time 1-2 minutes) followed by a thermal treatment in an oxygen atmosphere at a temperature in the range 700-800° C. (this thermal treatment is called in the field degreasing treatment); finally, the degreased body is subjected to high-temperature vacuum sintering (1600-1900° C. at a pressure lower than $10^{-3}$ Pa) to obtain a dense ceramic sintered body, and then to high-temperature (1300-1600° C.) annealing and precision polishing in an oxygen-containing atmosphere.

In the experience of the present inventors, however, when two slurries of different composition are deposited simultaneously, a cross-contamination of the slurries can occur; this is not an issue in the case of CN 109761608 A, since aim of this document is to obtain a graded structure. On the other hand, it must be noted that with this approach it is not possible to obtain components formed by two or more different chemical compositions with a high degree of definition of the dopant(s) distribution. Furthermore, the contamination between the slurries can also lead to the creation of optical defects (presence of unwanted ions—impurities) that degrade the performance of the material.

Other problems that may be encountered using the prior art methods in the preparation of transparent ceramic bodies with complex shapes and/or complex dopant(s) distribution profiles are:

partial sintering, that prevents the obtainment of high transparency because it is associated to the presence of starting powders that have not fully reacted or have reacted but have formed transient phases. In addition, partial sintering is accompanied by a diffused porosity;

residual porosity, acting as scattering centers and therefore decreasing transparency;

presence of secondary phases, which act as scattering and/or absorption centers and therefore decrease transparency and may introduce unwanted absorption;

defects at and around the interfaces or layers, which also act as scattering centers;

selective segregation of the ceramic powders in each slurry, preventing the formation of the chemical phase needed to obtain the required transparency;

deformation during sintering, preventing the formation of a body with the required shape and dimension.

The commercial exploitation of a next generation optical transparent ceramics is slowed by the lack of an industrial-friendly fabrication process for 3D transparent bodies.

It is an object of the present invention to provide a process for the production of transparent ceramic material bodies, which allows complete 3D control of the shape and of the composition and, in case of doped materials, doping ions distribution in the transparent material body. Another object of the invention is to provide the transparent ceramic bodies obtained with the process.

SUMMARY OF THE INVENTION

These objects are achieved by the present invention, which in a first aspect thereof relates to a process for the production of a transparent ceramic body, comprising the steps of:

a) preparing a first suspension comprising:
   1) a solvent;
   2) a mixture of powders of oxides, hydroxides or nitrates or chlorides of metals in the stoichiometric ratio required to produce an oxide phase $A_3B_5O_{12+x}$, wherein is $-0.1 \leq x \leq 0.1$, A is selected among Y, Ce, Pr, B is selected among Al, Fe, Cr, Sc, Ga and mixtures thereof;
   3) a sintering aid selected among silicon oxide in the form of powder, a tetraalkylorthosilicate, calcium oxide powder, a calcium oxide precursor, magnesium oxide powder, a magnesium oxide precursor, or a mixture thereof;
   4) a dispersant selected among polyethylene glycol, menhaden fish oil, phosphate esters, dicarboxylic acids, stearic acid and silanes;

b) extracting the solvent from the suspension of step a) obtaining a mixture;

c) preparing a homogeneous slurry comprising the mixture of step b) and a photocurable resin;

d) preparing at least a second suspension comprising:
   1') a solvent;
   2') a mixture of powders of oxides, hydroxides or nitrates or chlorides of metals in the stoichiometric ratio required to produce an oxide phase $A_3B_5O_{12+x}$, wherein is $-0.1 \leq x \leq 0.1$, A is selected among Y, Ce, Pr, Nd, Sm, Eu, Gd, Tb, Dy, Ho, Er, Tm, Yb, Lu and mixtures thereof, and B is selected among Al, Fe, Cr, Sc, Ga and mixtures thereof;
   3') a sintering aid selected among silicon oxide in the form of powder, a tetraalkylorthosilicate, calcium oxide powder, a calcium oxide precursor, magnesium oxide powder, a magnesium oxide precursor, or a mixture thereof;
   4') a dispersant selected among polyethylene glycol, menhaden fish oil, phosphate esters, dicarboxylic acids, stearic acid and silanes;
   in which the at least one second suspension has a different composition from the first suspension;
e) extracting the solvent from the suspension of step d) obtaining a mixture;
f) preparing a homogeneous slurry comprising the mixture of step e) and a photocurable resin;
g) operating at a temperature between 20 and 30° C., forming a deposit comprising layers of the slurries of steps c) and f) by a layer-by-layer 3D printing technique wherein, after the deposition of each layer of slurry, a photopolymerization operation of the photocurable resin is carried out, and a cleansing operation of a series of photopolymerized layers of a first composition is carried out before depositing on it or next to it a layer of slurry of a second composition to remove the non-polymerized slurry of first composition, obtaining a consolidated body;
h) subjecting the consolidated body of step g) to a thermal treatment in air or in an oxygen-rich atmosphere at a temperature in the range 100 to 1000° C. for removing the organic and volatile components of the consolidated body, obtaining a degreased body;
i) subjecting the degreased body of step h) to a sintering thermal treatment in vacuum at a temperature in the range from 1600° C. to 1900° C. for a time in the range from 6 h to 32 h obtaining a sintered body; or
i') subjecting the degreased body of step h) to a sintering thermal treatment in vacuum at a temperature in the range from 1400° C. to 1800° C. for a time in the range from 2 h to 20 h followed by hot isostatic pressing with an applied pressure in the range from 100 to 300 bar at a temperature in the range from 1400° C. to 1800° C. for a time in the range from 1 h to 4 h obtaining a sintered body.

The process of the invention may further comprise an optional step j), in which the sintered body obtained in step i) or in step i') is subjected to an annealing treatment in an oxidizing or a reducing atmosphere, in order to adjust the oxidation state of dopants.

In a second aspect, the invention relates to the transparent ceramic materials obtained with the process described above, and to optical devices based on these materials.

DETAILED DESCRIPTION OF THE INVENTION

Figure 1:
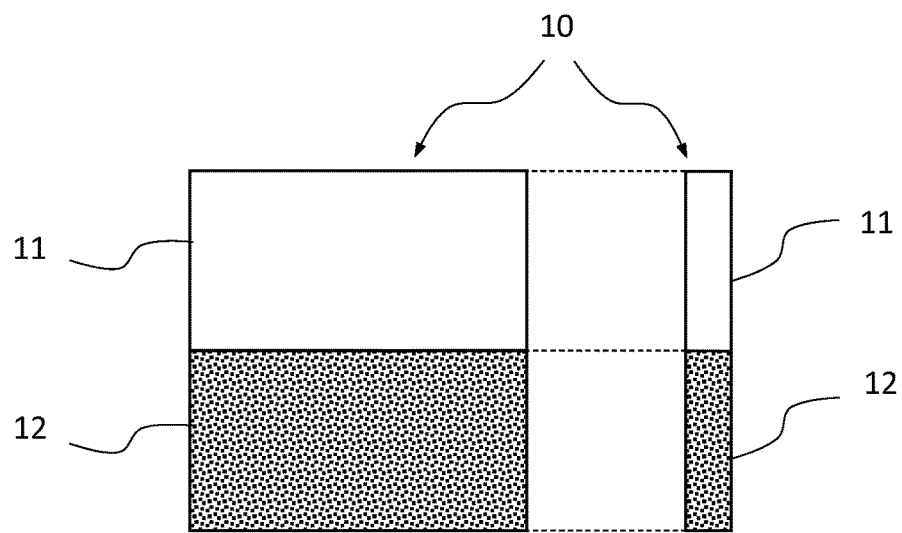
FIG. 1 shows schematically a first possible ceramic transparent body of the invention, constituted by two parts of materials of different chemical composition.

The inventors have observed that, although methods for the production of transparent ceramic bodies were generally known in the art, also based on 3D printing techniques, only the combination of conditions and steps of the process of the invention allows to obtain a complete control of the composition profile of the final transparent ceramic bodies in the three spatial directions; in particular, the deposition of layers at temperatures between 20 and 30° C., the use of a dispersant and the cleansing of any layer after photopolymerization, are essential to obtain the desired results.

The invention will be described below with reference to the figures.

In its first aspect, the invention refers to a process for producing transparent ceramic bodies having preset complex shapes and/or a controlled complex distribution of doping ions.

For the objects of the invention, the compounds used in the process must be highly pure; for instance, the oxides, hydroxides or nitrates mentioned below must have a purity of at least 99%, and preferably higher than 99.99%.

For the sake of simplicity, the process is described below with reference to the preparation and use of two different slurries, but it will be apparent to the skilled person that the steps of the process can be carried out also with three or more slurries, to obtain transparent ceramic bodies of more complex composition profiles.

The process comprises steps a) to i) or i'), or steps a) to j), as described in detail below.

The first step of the process, step a), consists in preparing a homogeneous slurry of: 1) a solvent, 2) a mixture of powders of precursors of the desired garnet phase, 3) one or more sintering aids, and 4) a dispersant.

The solvent, 1), may be selected among alcohols, e.g., ethanol or isopropanol, and usually the weight of the solvent is between 1.5 and 2.5 times, preferably about twice, the weight of 2), the mixture of powders.

Component 2) consists in mixed powders of oxides, hydroxides, nitrates or chlorides of metals, in the exact stoichiometric ratio required to produce the desired oxide phase $A_3B_5O_{12+x}$, wherein A, B and x have the meanings indicated above. These powders must have a mean grain size lower than 10 µm, and preferably lower than 5 µm; besides, the shape of the powder grains must be essentially or nearly spherical, with an aspect ratio between 0.8 and 1.0.

These powders are of common commercial availability from many suppliers; as an example, rare earth oxides are sold by Alfa Aesar (USA) and Merck (Germany).

The more common oxidation state of rare earth elements is +3, but also oxidation states +2 (e.g., $Sm^{2+}$, $Eu^{2+}$ or $Yb^{2+}$) or +4 (e.g., $Ce^{4+}$) are possible; similarly, the metals Sc, Fe and Cr may exist in oxidation state +3 but also in other oxidations states. The parameter x, which may vary between −0.1 and 0.1, accounts for the variability of stoichiometry of oxygen due to the presence in the material of ions with oxidation state different from +3; x is positive if, on average, the oxidation state of the ions of metals A and B is >3, and it is negative if on average the oxidation state of said metals is <3. Given the formula of the desired specific composition, the calculation of amounts of the different oxides, hydroxides or nitrates or chlorides to be used for the preparation of the mixture of step a) is straightforward for the average chemist.

The sintering aid, 3), is selected among silicon oxide ($SiO_2$, commonly referred to as silica) powder, a tetraalkylorthosilicate (general formula $Si(OR)_4$, where R is generally a $C_1$-$C_4$ alkyl), calcium oxide powder, a calcium oxide precursor, magnesium oxide powder, a magnesium oxide precursor, or a mixture thereof. This component makes easier and more efficient the sintering in step i) or i'). When the component used as sintering aid is, or comprises compounds, in the form of powders, these must have a grain size lower than 2 µm, and preferably lower than 1 µm. A useful form of silicon oxide is colloidal silica, a suspension of silica powder consisting of aggregates of silica particles of nanometric size. The sintering aid component, when used as oxide, is added in a weight between 0.0005 and 0.003 g per gram of the mixture 2) of precursors of the garnet phase.

Finally, the dispersant, 4), is selected among polyethylene glycol, menhaden fish oil, phosphate esters, dicarboxylic acids, stearic acid and silanes. Polyethylene glycol is commonly referred to as PEG; menhaden fish oil, in the following also indicated by the abbreviation MFO, is preferably used blown (that is, treated by blowing air in it to cause a partial oxidation of its unsaturated bonds).

All these substances are commercially available. The molecular weight of PEG useful for the aims of the invention is between 200 and 600 Da. The amount of dispersant is between 0.5 and 5%, preferably between 1.5 and 2.5% by weight, of the suspension of step a).

Components 1), 2), 3) and 4) may be homogenized with any mixing method, obtaining a homogeneous suspension.

Step b) of the process of the invention consists in the extraction of the solvent from the suspension prepared in step a), performed by any method, obtaining a wet mixture.

Step c) of the process of the invention consists of preparing of homogeneous slurry of the mixture obtained in step b) and a photocurable resin.

Photocurable resins are widely known and extremely common in particular in the field of production of semiconductors and microelectromechanical systems (MEMS), and are sold by many suppliers; a suitable photocurable resin useful for the objects of the invention is for example a mixture of 1,6-hexanediol diacrylate, an acrylated oligoamine, benzyl alcohol, camphorquinone and ethyl 4-(dimethylamino)benzoate. The slurry may be homogenized with any mixing method. The total amount of the photocurable resin is between 50 and 60% by volume of the slurry.

Steps d) to f) of the process of the invention consists of preparation of a second homogeneous slurry. The components of this slurry, as well as their weight or volume ratios, are the same as in the slurry prepared in steps a) to c), but the specific compositions of the first and second slurries employed in the production of a ceramic body must be different. The total amount of the photocurable resin in the two slurries must not differ by more than 3% by volume so that the difference in linear shrinkage between the parts printed with them is lower than 3%.

In case more than two slurry are prepared and used, these last conditions must be observed for all slurries, that is, these will all have different compositions, and the total amount of resin must not differ by more than 3% by volume between any pair of resins used.

In step g), the slurries prepared in steps c) and f) are used to form a deposit of desired configuration by 3D printing, by depositing layers of the first and second slurries according to a preset temporal order of deposition and pattern, followed by cleansing before any change of slurry. Each step of layer deposition must take place at a temperature in the range between 20 and 30° C.; the inventors have observed that, operating at temperatures higher than 30° C., a selective sedimentation of the oxides takes place in the printed layers, while at temperatures below 20° C. the slurries are difficult to dispense and spread.

The preferred technique for the aims of the invention is lithography-based ceramic manufacturing (LCM), a variant of stereolithography. In this technique, a thin layer of the first and second slurries prepared in steps c) and f) is deposited on a substrate, which is a sample holder in the first passage, and already consolidated layers in the next passages; each deposited layer has generally a thickness of about 10 to 100 µm, and is deposited according to a preset geometry, defined through CAD design, and consolidated by light irradiation with the use of suitable physical or digital masks.

The LCM method can be described as follows: a strong LED with a defined light spectrum exposes a mirror array (Digital Mirror Device—DMD). The DMD partially transmits the light (individual mirrors on position 1) or sends the light to an absorption field (individual mirrors on position 0). The forwarded light is projected through a lens as a pixel pattern (exposure field) onto the vat that contains the slurry. This selective exposure of the photosensitive material causes a hardening of the material at the exposed areas by photopolymerisation. In this process, photocurable organic binders, in which ceramic particles are homogeneously dispersed, are applied in layers and then cured area-wise according to the method described above. The photopolymerisation light wavelength depends on the used resin and is generally indicated by the producer; with the preferred resins of the invention, the photopolymerisation wavelength is between 375 and 460 nm.

The construction of a consolidated body is thus achieved layer-by-layer, in cycles comprising an operation of slurry deposition followed by an operation of photopolymerization of the resin of the layer. Any time the structure of the desired final body requires the deposition, in contact with the already consolidated layers (i.e., over and/or adjacent to said consolidated layers), of a slurry having a different composition from the slurry with which said consolidated layers have been formed, the intermediate product obtained after the last photopolymerization operation must be cleansed, for instance with the use of solvents, to remove non-consolidated remainders of the previous slurry.

In the consolidated body thus obtained, the particles of the various oxides are embedded in a matrix of hardened polymer obtained by photopolymerization ("photocuring") of the resin. This consolidated body has already the shape and the desired profile of composition in the three spatial directions of the final transparent ceramic body.

The next step of the process, h), consists in the removal of the polymer produced by the photocuring of the resin, of the dispersant, and of other possible volatile components of the consolidated body. This operation is called "debinding" and is preferably carried out in air or an oxygen-rich atmosphere. In this step the consolidated body is subjected to a thermal treatment carried out by bringing it from room temperature to a temperature from 100 to 1000° C., preferably in the range 550-800° C., in up to 72 hours; heating in this phase must be not too rapid, to avoid local accumulations of gases generated by decomposition of the polymer or evaporation of light compounds, which could cause deformation of the body or even pressure bursts that could destroy it. In particular, the heating rate must be between 0.05° C./min and 2° C./min, and preferably below 0.25° C./min in the range between 115 and 250° C. The product obtained as a result of this step is a debinded body with a density from 40 to 60% of the full density.

The following step of the process consists in the sintering in vacuum of the debinded body to obtain the final ceramic body. By "vacuum" it is intended a pressure lower than $10^{-1}$ Pa.

Sintering may be carried out according to two possible alternative methods, namely, performing a purely thermal sintering step i), or a thermal sintering step followed by hot isostatic pressing according to step i'). During either of these steps, the garnet phases are formed from the oxides of mixtures 2) and 2') and the material densifies, i.e., the porosity of the debinded body is removed.

Step i) is carried out by subjecting the debinded body of step h) to a thermal treatment in vacuum at a temperature in the range from 1600° C. to 1900° C. for a time in the range from 6 h to 32 h, obtaining the transparent ceramic body object of the invention.

Step i') is carried out by subjecting the debinded body of step h) to a sintering thermal treatment in vacuum at a temperature in the range from 1400° C. to 1800° C. for a time in the range from 2 h to 20 h followed by hot isostatic pressing (HIP) with an applied pressure in the range from 100 to 300 bar at a temperature in the range from 1400° C. to 1800° C. for a time in the range from 1 h to 4 h, obtaining the transparent ceramic body object of the invention. HIP may be performed with the aid of a gas and a compressor and setting the desired sintering temperature. As a rule, higher pressures allow working at lower temperatures; this slows down grain growth, thus providing an advantage in terms of transparency.

In both steps i) or i'), the heating rate in the temperature range 1200-1600° C. must be below 100° C./h.

A vacuum furnace with a clean atmosphere (graphite-free) is preferably used for the sintering process in either of steps i) or i').

The process may further comprise an optional step j), in which the transparent ceramic body obtained in step i) or i') is subjected to an annealing treatment in oxidizing or reducing atmosphere, directed to bringing the dopant ions into a desired oxidation state; this may be necessary, for instance, if dopant ions have been oxidized during debinding step h), or reduced during sintering steps i) or i') which are carried out in vacuum.

In a second aspect thereof, the invention provides transparent ceramic bodies that may be used as elements of optical systems, in production, amplification, shaping or guiding of laser beams, as scintillators and other similar applications.

The preferred bodies of the invention are based on two YAG compositions modified with doping ions or on one pure YAG composition and one modified with doping ions.

The process of the invention is useful and advantageous for the production of transparent ceramic bodies having a non-uniform, controlled spatial distribution of the doping ions in the three spatial directions, both in case of bodies of simple shape and with complex shapes.

A few examples of possible transparent ceramic bodies that can be produced with the process of the invention are described below.

For the sake of simplicity, in the Figures described below the transparent ceramic bodies are mostly shown as disc-shaped, but with the process of the invention obviously other shapes can be produced; bodies similar to the one shown in the Figures below (i.e., layered bodies or bodies with graded profiles of dopant concentration, even in complex configurations) could have any shape, e.g. square, rectangular, or other polygonal or even irregular shapes; in the Figures both 2D and 3D structures are represented, as with the process of the invention it is possible to produce also complex 3D shapes and 3D distribution of the dopants.

FIG. 1 shows, in a top view and a side view, a transparent ceramic body, 10, consisting of two parts (11 and 12) of different composition (for instance, doped YAG and undoped YAG) printed side-by-side; this body may be produced as described in Example 3.

Figure 2:
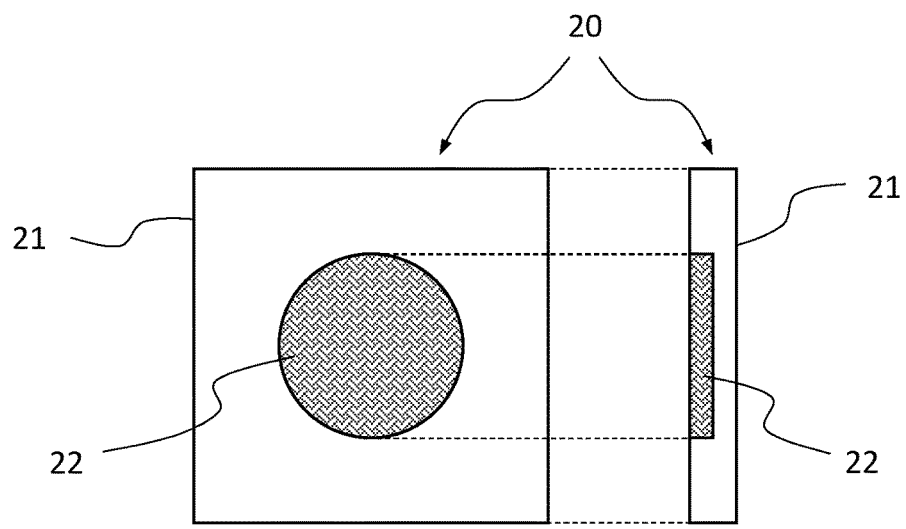
FIG. 2 shows a second possible ceramic transparent body of the invention, constituted by a zone of a first chemical composition partially embedded in a zone of a second chemical composition.

FIG. 2 shows, in a top view and a side view, a body, 20, consisting of two parts (21 and 22) of different uniform compositions (for instance, doped YAG and undoped YAG). The concentric inset 22 has a doped YAG composition, and the outer zone 21 has an undoped YAG composition; this body may be produced as described in Example 7.

Figure 3:
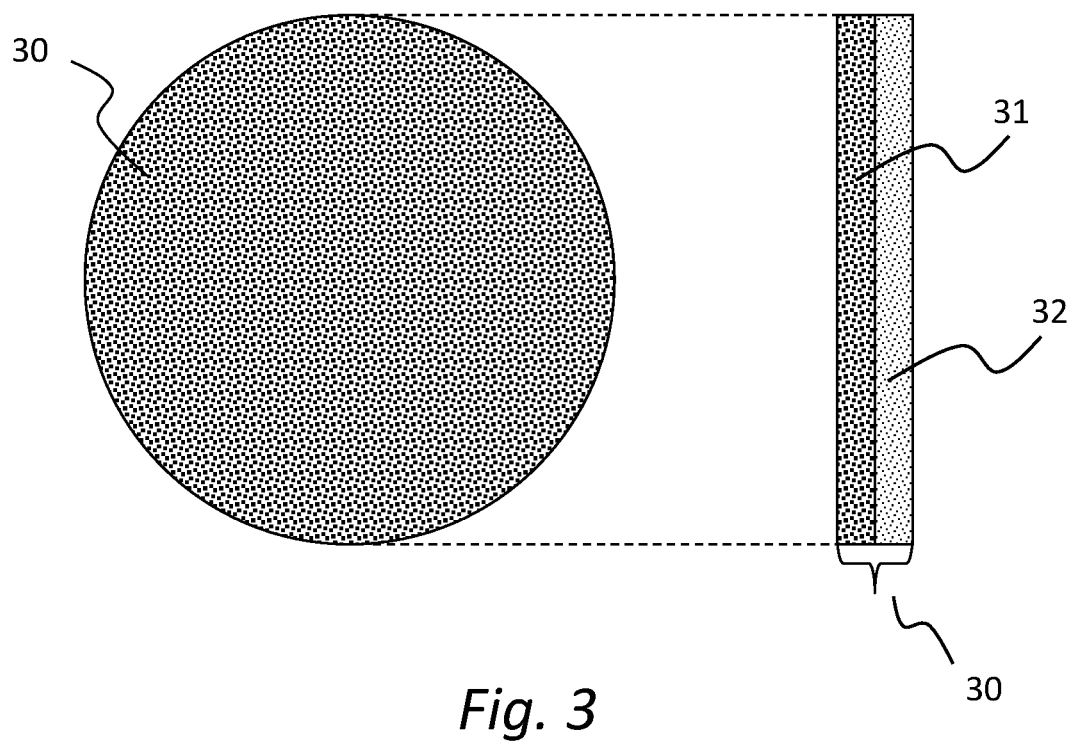
FIGS. 3 to 6 show further possible ceramic transparent bodies of the invention having complex 3D structures.

FIG. 3 shows, in a top view and a side view, a body, 30, consisting of two layers 31 and 32 of different composition (for instance, one doped YAG layer and an undoped YAG layer); this body may be produced by printing, in step g) of the process of the invention, first a series of layers of a slurry produced in step c), and then a second series of layers of a slurry produced in step f). During the subsequent sintering step (i) or i')), a limited amount of ions usually diffuses between the doped YAG and the undoped YAG layer, forming a thin graded interlayer (up to 150 μm) that does not affect the stepped nature of the overall body.

Figure 4:
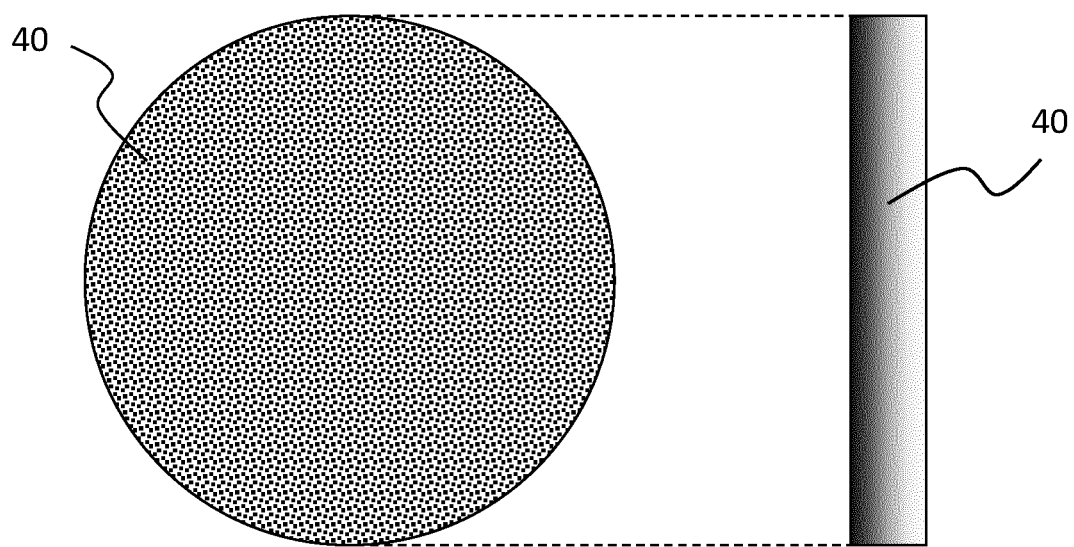

FIG. 4 shows, in top and side view, another possible ceramic transparent body of the invention, 40. This body is formed as a single part, in which there is a layer of graded profile of chemical composition (graded dopant concentration) across the thickness of the body. This body may be produced by preparing, in several steps of kind c) and f), a few slurries with different concentrations of dopants; and by repeating step g) by depositing the different slurries in order of descending (or ascending) dopant concentration. The consolidated body prepared repeating step g) with different slurries has a stepped profile of doping ions across its thickness, but during the subsequent sintering step (i) or i')) the doping ions diffuse from the zones at higher concentration towards the zones at lower concentration, and the resulting concentration profile is essentially a continuous gradient.

Figure 5:
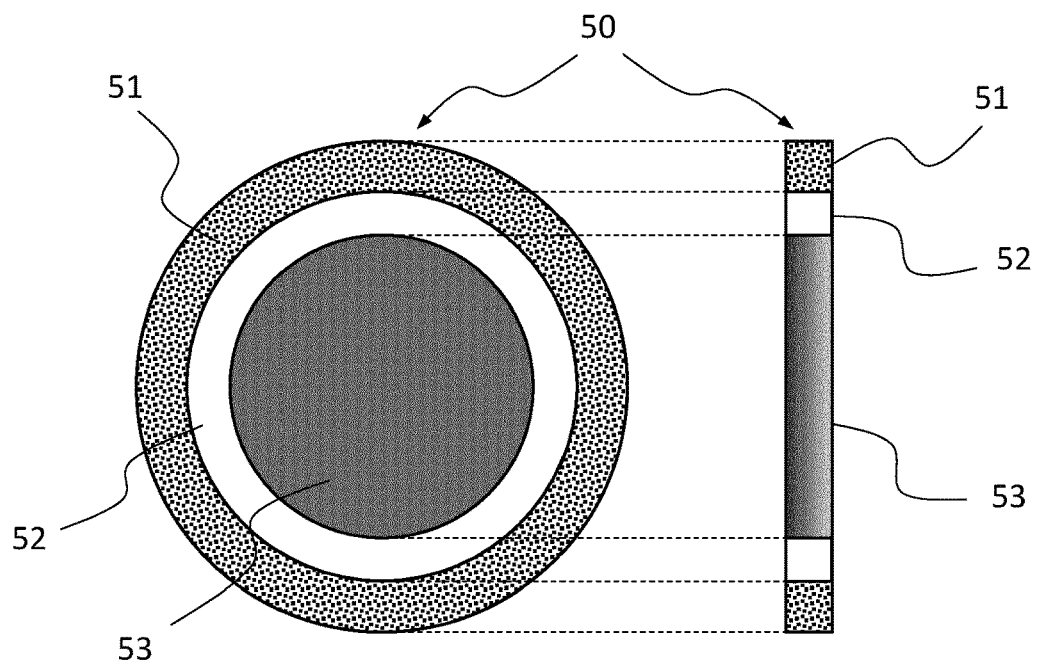
Figure 6:
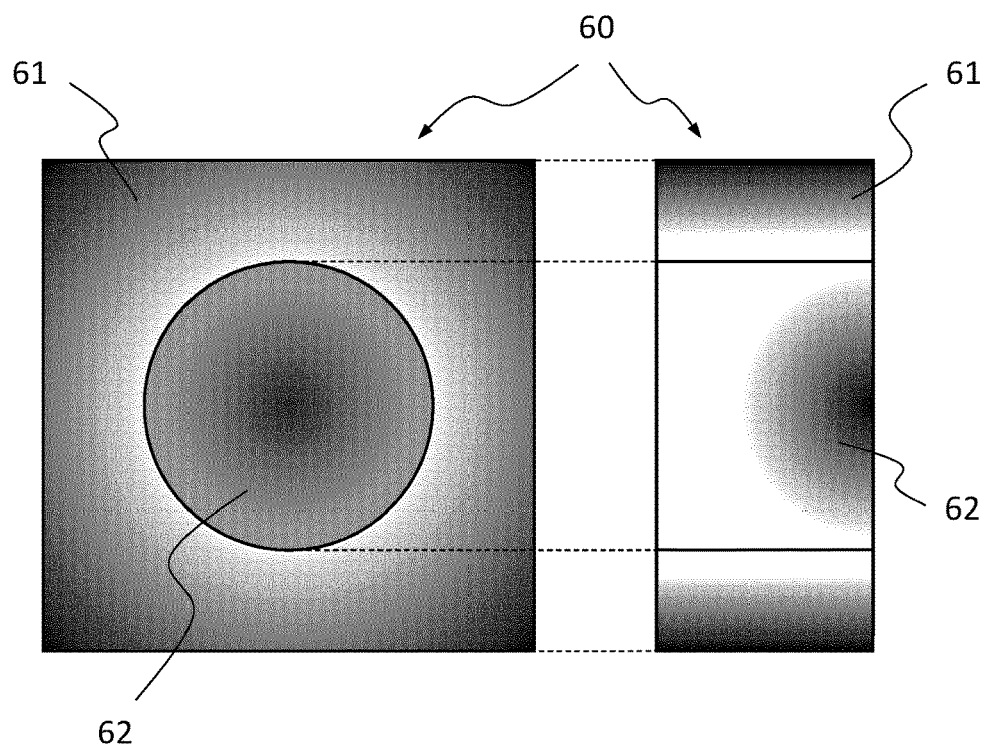

FIGS. 5 and 6 show, in top and side views, further possible ceramic transparent bodies of the invention having complex 3D structures. These structures too may be produced by suitably preparing and printing in several steps g) different slurries, as described above with reference to FIG. 4.

In particular, FIG. 5 shows a body, 50, made of three concentric zones (respectively 51, 52 and 53 from the outmost zone one to the central zone) of different composition, and in which external zone 51 and intermediate zone 52 have a uniform composition while the central zone 53 has a composition graded across its thickness; a body of this kind may also be produced in the form of elongated rods with circular or polygonal cross section. This body may be produced by preparing, in several steps of kind c) or f), a few slurries with different concentrations of dopants; and by repeating step g) by printing the different slurries in order of descending (or ascending) dopant concentration. The consolidated body prepared repeating step g) with different slurries has a stepped profile of doping ions across the thickness of the body, but during the subsequent sintering step (i) or i')) the doping ions diffuse from the zones at higher concentration towards the zones at lower concentration, and the resulting concentration profile is essentially a continuous gradient.

FIG. 6 shows another possible transparent body of the invention, 60, consisting of concentric zones of different composition, in which an outer zone (61) has a radially graded profile of composition, and the central zone (62) has a hemispherically graded profile of composition; this configuration too may be obtained in bodies having the form of elongated rods with circular or polygonal cross section.

The invention is further illustrated by the following examples.

Example 1

This example refers to the preparation of a sample of Yb-doped YAG having composition $Yb_{0.3}Y_{2.7}Al_5O_{12}$.

In the preparation, commercially available raw materials were used, $Al_2O_3$ TM-DAR produced by Taimei Chemicals CO., Ltd, $Y_2O_3$ REacton® produced by Alfa Aesar and $Yb_2O_3$ produced by Sigma Aldrich. All powders had a purity level ≥99.9%.

The oxide powders were weighed according to the stoichiometry of 10% atomic substitution of Y with Yb ($Yb_{0.3}Y_{2.7}Al_5O_{12}$), i.e., $Al_2O_3$ 41.19 g, $Y_2O_3$ 49.26 g and $Yb_2O_3$ 9.55 g. The mixture of oxides powders was mixed for 48 hours with 200 g of ethanol and 0.5 g of tetraethyl orthosilicate (Sigma Aldrich) as sintering agent by ball milling in plastic jars using 300 g $Al_2O_3$ milling media with diameter ranging from 0.5 to 2 cm. The ethanol was then extracted by rotary evaporation. The obtained powders were then mixed with 1,6-hexanediol diacrylate, an acrylated oligoamine (Genomer* 5695, RAHN AG, Switzerland) and benzyl alcohol using a planetary mill at 300 rpm for 30 min. Afterwards, camphorquinone and ethyl 4-(dimethylamino) benzoate were added as photo-initiators and the slurry was ball milled for 24 h, obtaining a photocurable suspension. The solids loading was 42 vol %.

Printing was done at 25° C., with a layer thickness of 20 μm and an exposure energy of 170 mJ/cm². Afterwards the printed body was cleaned and dried at 120° C.

The size of the printed sample was 13.5 mm×13 mm with a thickness of 1.75 mm. Debinding was performed in air at the temperature of 600° C. Sintering was performed in a vacuum furnace with tungsten heating elements at temperature 1750° C. with soaking time of 16 h. The sintered body was mirror polished and annealed in air until the $Yb^{2+}$ ions, that were produced during vacuum sintering, were oxidised to $Yb^{3+}$. Finally, the sample was polished with diamond pastes with grain size from 30 μm down to 0.25 μm using standard optical polishing machines.

Example 2

This example refers to the optical characterization of the sample of doped YAG produced in Example 1.

The $Yb_{0.3}Y_{2.7}Al_5O_{12}$ sample of Example 1 was tested in a laser cavity, longitudinally pumped by a fiber coupled semiconductor laser. This is a typical test bed to assess the laser emission performances of candidate laser materials. Laser emission was obtained from the sample, at a wavelength of 1030 nm, with a maximum slope efficiency of 17% and a maximum output power of 2.2 W, with an absorbed pump power of 13.6 W (conversion efficiency 15.5%), under quasi-continuous pumping conditions.

Example 3

This example refers to the preparation of a sample of YAG/Yb-doped YAG (wherein YAG has composition $Y_3Al_5O_{12}$ and the doped YAG has composition $Yb_{0.3}Y_{2.7}Al_5O_{12}$) with a side-by-side structure, having a geometry as shown in FIG. 1.

In the preparation, commercially available raw materials were used, $Al_2O_3$ TM-DAR produced by Taimei Chemicals CO., Ltd, $Y_2O_3$ REacton® produced by Alfa Aesar and $Yb_2O_3$ produced by Sigma Aldrich. All powders had a purity level 99.9%. Two mixtures were prepared.

For the first mixture, oxide powders were weighed according to the stoichiometry of 10% atomic substitution of Y with Yb ($Yb_{0.3}Y_{2.7}Al_5O_{12}$), i.e., $Al_2O_3$ 41.19 g, $Y_2O_3$ 49.26 g and $Yb_2O_3$ 9.55 g. The mixture of oxide powders was mixed for 48 hours with 200 g of ethanol, 0.5 g of tetraethyl orthosilicate (Sigma Aldrich) as sintering agent and 2.0 g of MFO (Blown Menhaden Z3/Defloc Z3, Werner G. Smith, Inc.) by ball milling in plastic jars using 300 g $Al_2O_3$ milling media with diameter ranging from 0.5 to 2 cm. The ethanol was then extracted by rotary evaporation. The obtained powders were then mixed with 1,6-hexanediol diacrylate, an acrylated oligoamine (Genomer* 5695, RAHN AG, Switzerland) and benzyl alcohol using a planetary mill at 300 rpm for 30 min. Afterwards, camphorquinone and ethyl 4-(dimethylamino)benzoate were added as photo-initiators and the slurry was ball milled for 24 h, obtaining a photocurable suspension. The solids loading was 42 vol %.

For the second mixture, oxide powders were weighed according to the stoichiometry of YAG ($Y_3Al_5O_{12}$), i.e., $Al_2O_3$ 42.94 g, $Y_2O_3$ 57.06 g. The mixture of oxides powders was mixed for 48 hours with 200 g of ethanol, 0.5 g of tetraethyl orthosilicate (Sigma Aldrich) as sintering agent and 2.0 g of MFO (Blown Menhaden Z3/Defloc Z3, Werner G. Smith, Inc.) by ball milling in plastic jars using 300 g $Al_2O_3$ milling media with diameter ranging from 0.5 to 2 cm. The ethanol was then extracted by rotary evaporation. The obtained powders were then mixed with 1,6-hexanediol diacrylate, Genomer* 5695 and benzyl alcohol using a planetary mill at 300 rpm for 30 min. Afterwards, camphorquinone and ethyl 4-(dimethylamino)benzoate were added as photo-initiators and the slurry was ball milled for 24 h, obtaining a photocurable suspension. The solids loading was 42 vol %.

Printing was done at 25° C., with a layer thickness of 20 μm and an exposure energy of 170 mJ/cm².

Half of each 20 μm layer was printed with the first mixture and half with the second mixture. The cleansing operation followed each change of mixture, to completely remove the unpolymerized slurry from the printed body.

Afterwards the printed body was cleaned and dried at 120° C.

The size of the printed sample was 13.5 mm×13 mm with a thickness of 1.75 mm. Debinding was performed in air at 600° C. Sintering was performed in a vacuum furnace with tungsten heating elements at temperature 1750° C. with soaking time of 16 h. The sintered body was mirror polished and annealed in air until the $Yb^{2+}$ ions, that were produced during vacuum sintering, were oxidised to $Yb^{3+}$. Finally, the sample was polished with diamond pastes with grain size from 30 µm down to 0.25 µm using standard optical polishing machines.

The desired structure was obtained.

Example 4 (Comparative)

The procedure of Example 3 was repeated identically, with the only difference that the cleansing operation after each change of mixture in the printing phase was not carried out.

The desired structure was not obtained due to the cross-contamination of slurries that led to a mixed composition in both parts of the body.

Example 5 (Comparative)

The procedure of Example 3 was repeated identically, with the only difference that the printing step was carried out at 40° C.

Due to the rheological properties of the slurry at this temperature, the desired side-by-side structure could not be obtained.

Example 6 (Comparative)

The procedure of Example 3 was repeated identically, with the only difference that the two slurries of precursors of the ceramic phases were prepared using 2.0 g of the commercial dispersant Tego® Dispers 652 (Evonik Industries AG, Essen, Germany) in place of 2.0 g of MFO.

The desired results were not obtained because the viscosity of the slurries was too high to allow printing.

Example 7

This example refers to the preparation of the complex, 3D structure showed in FIG. 2.

Two slurries were prepared as described in Example 3.

Printing was done at 25° C., according to FIG. 2, with a layer thickness of 20 µm and an exposure energy of 170 mJ/cm². The cleansing operation followed each change of slurry, to completely remove the unpolymerized slurry from the printed body.

Afterwards the printed body was cleaned and dried at 120° C.

The size of the printed sample was 13 mm×13 mm with a thickness of 2 mm. The circular inset had a thickness of 1 mm and diameter 6 mm. Debinding was performed in air at the temperature of 600° C. Sintering was performed in a vacuum furnace with tungsten heating elements at temperature 1750° C. with soaking time of 16 h. The sintered body was mirror polished and annealed in air until the $Yb^{2+}$ ions, that were produced during vacuum sintering, were oxidised to $Yb^{3+}$. Finally, the sample was polished with diamond pastes with grain size from 30 µm down to 0.25 µm using standard optical polishing machines.

The desired structure was obtained.

The invention claimed is:

1. A process for the production of a transparent ceramic body, comprising the steps of:
 a) preparing a first suspension comprising:
  1) a solvent;
  2) a mixture of powders of oxides, hydroxides, nitrates or chlorides of metals in the stoichiometric ratio required to produce an oxide phase $A_3B_5O_{12+x}$, wherein is $-0.1 \leq x \leq 0.1$, A is selected among Y, Ce, Pr, Nd, Sm, Eu, Gd, Tb, Dy, Ho, Er, Tm, Yb, Lu and mixtures thereof, and B is selected among Al, Fe, Cr, Sc, Ga and mixtures thereof;
  3) a sintering aid selected among silicon oxide in the form of powder, a tetraalkylorthosilicate, calcium oxide powder, a calcium oxide precursor, magnesium oxide powder, a magnesium oxide precursor, or a mixture thereof;
  4) a dispersant selected among polyethylene glycol, menhaden fish oil, phosphate esters, dicarboxylic acids, stearic acid and silanes;
 b) extracting the solvent from the suspension of step a) obtaining a mixture;
 c) preparing a homogeneous slurry comprising the mixture of step b) and a photocurable resin;
 d) preparing at least a second suspension comprising:
  1') a solvent;
  2') a mixture of powders of oxides, hydroxides, nitrates or chlorides of metals in the stoichiometric ratio required to produce an oxide phase $A_3B_5O_{12+x}$, wherein is $-0.1 \leq x \leq 0.1$, A is selected among Y, Ce, Pr, Nd, Sm, Eu, Gd, Tb, Dy, Ho, Er, Tm, Yb, Lu and mixtures thereof, and B is selected among Al, Fe, Cr, Sc, Ga and mixtures thereof;
  3') a sintering aid selected among silicon oxide in the form of powder, a tetraalkylorthosilicate, calcium oxide powder, a calcium oxide precursor, magnesium oxide powder, a magnesium oxide precursor, or a mixture thereof;
  4') a dispersant selected among polyethylene glycol, menhaden fish oil, phosphate esters, dicarboxylic acids, stearic acid and silanes;
 e) extracting the solvent from the suspension of step d) obtaining a mixture;
 f) preparing a homogeneous slurry comprising the mixture of step e) and a photocurable resin;
 g) operating at a temperature between 20 and 30° C., forming a deposit comprising layers of the slurries of steps c) and f) by a layer-by-layer 3D printing technique wherein, after the deposition of each layer of slurry, a photopolymerization operation of the photocurable resin is carried out, and a cleansing operation of a series of photopolymerized layers of a first composition is carried out before depositing on it or next to it a layer of slurry of a second composition to remove the non-polymerized slurry of first composition, obtaining a consolidated body;
 h) subjecting the consolidated body of step g) to a thermal treatment in air or in an oxygen-rich atmosphere at a temperature in the range 100 to 1000° C. for removing the organic and volatile components of the consolidated body, obtaining a degreased body;
 i) subjecting the degreased body of step h) to a sintering thermal treatment in vacuum at a temperature in the range from 1600° C. to 1900° C. for a time in the range from 6 h to 32 h obtaining a sintered body; or
 i') subjecting the degreased body of step h) to a sintering thermal treatment in vacuum at a temperature in the range from 1400° C. to 1800° C. for a time in the range from 2 h to 20 h followed by hot isostatic pressing with an applied pressure in the range from 100 to 300 bar at a temperature in the range from 1400° C. to 1800° C. for a time in the range from 1 h to 4 h obtaining a sintered body;
in which said first suspension and said at least one second suspension have different compositions.

2. The process according to claim 1, further comprising a step j) in which the sintered body obtained in step i) or in step i') is subjected to an annealing treatment in an oxidizing or a reducing atmosphere, in order to adjust the oxidation state of possible dopants.

3. The process according to claim 1, wherein the powders of metal oxides, hydroxides, nitrates or chlorides of mixtures 2) and 2') have a mean grain size lower than 10 µm, an aspect ratio between 0.8 and 1.0 and a purity of at least 99%.

4. The process according to claim 1 wherein, when the sintering aids 3) and 3') are or comprise compounds in form of powders, these have a grain size lower than 2 µm.

5. The process according to claim 1 wherein the solvent, 1) or 1'), is an alcohol, and its weight is between 1.5 and 2.5 times the weight of 2) or 2'), the mixture of powders.

6. The process according to claim 1 wherein sintering aids 3) and 3') are employed in a weight between 0.0005 and 0.003 g per gram respectively of the mixtures 2) and 2') of powders of metal oxides, hydroxides, nitrates or chlorides.

7. The process according to claim 1 wherein the photo-curable resin is employed in an amount between 50 and 60% in volume of the slurry of step c) or f).

8. The process according to claim 1 wherein the amount of dispersant 4) is between 1.5 and 2.5% by weight of the suspension prepared in step a) and the amount of dispersant 4') is between 1.5 and 2.5% by weight of the suspension prepared in step d).

9. The process according to claim 1 wherein, wherein step g) is carried out by lithography-based ceramic manufacturing (LCM).

10. The process according to claim 1 wherein step h) is carried out at a temperature in the range 550-800° C. for a time up to 72 hours with a heating rate between 0.05° C./min and 2° C./min, and below 0.25° C./min in the range of temperatures between 115 and 250° C.

11. The process according to claim 3, wherein the powders of metal oxides, hydroxides, nitrates or chlorides of mixtures 2) and 2') have a mean grain size lower than 5 µm and a purity higher than 99.99%.

12. The process according to claim 4 wherein, when the sintering aids 3) and 3') are or comprise compounds in form of powders, these have a grain size lower than 1 µm.

* * * * *